United States Patent [19]

Rademaker

[11] Patent Number: 5,409,721
[45] Date of Patent: Apr. 25, 1995

[54] METHOD FOR POSITIONING DOUGH PIECES

[75] Inventor: Mattheus A. Rademaker, Culemborg, Netherlands

[73] Assignee: Machinefabriek M.A. Rademaker B.V., Netherlands

[21] Appl. No.: 58,647

[22] Filed: May 7, 1993

[30] Foreign Application Priority Data

May 8, 1992 [NL] Netherlands ............... 9200828

[51] Int. Cl.⁶ .............................................. A21D 6/00
[52] U.S. Cl. ..................................... 426/496; 426/503; 426/512
[58] Field of Search ............... 426/496, 500, 503, 512, 426/518; 99/450.1; 198/379, 468.3

[56] References Cited

U.S. PATENT DOCUMENTS 5,169,664 12/1992 Ueno ..................... 426/496

FOREIGN PATENT DOCUMENTS 0382105 2/1990 European Pat. Off. .
7212252 9/1972 Netherlands .
1292378 3/1970 United Kingdom .

Primary Examiner—George Yeung
Attorney, Agent, or Firm—Webb Ziesenheim Bruening Logsdon Orkin & Hanson

[57] ABSTRACT

The invention relates to a method for positioning in a row with corresponding sides mutually parallel similarly shaped dough pieces lying form-fittingly in a row on a carrier by causing a force to be exerted on a point on the periphery with a moving carrier member whereof the operating line lies outside the centre of gravity of the dough piece, and to a device for applying this method.

4 Claims, 5 Drawing Sheets

METHOD FOR POSITIONING DOUGH PIECES

BACKGROUND OF THE INVENTION

Field of the Invention

The invention relates to a method for positioning in a row with corresponding sides mutually parallel similarly shaped dough pieces lying form-fittingly in a row on a carrier.

Prior Art

The continuous production of dough products, for instance croissants, is developing an increasingly wider product range in respect of both dough types and forms of product. A typical structure of the production process consists of the following part-processes: dough preparation, making dough product portions, arranging the product shape and baking. The present invention relates to the first part of the process of arranging the product form. If the dough product portions in the form of dough pieces are supplied form-fittingly in a row on a carrier and first require an orientation with corresponding sides parallel to each other prior to arranging of a definitive product form, methods and devices exist for performing thereof. Several drawbacks of the already existing methods and devices are the following: difficult positioning synchronization, limited capacity, considerable wear, susceptibility to disturbance and structural complexity.

SUMMARY OF THE INVENTION

The object of the invention is to provide a method and device wherein the dough wafer itself forms the reference for a good positioning synchronization, the capacity is greater than the existing solutions provide and a limited number of components which make continuous movements is necessary.

This is achieved with the invention by exerting a force on a point on the periphery of a dough wafer with a moving carrier member the operating line of which force lies outside the centre of gravity of the dough piece.

In the proposed method the direction of movement of the carrier member is preferably always the same during exerting of the force and successive dough pieces are also preferably engaged on non-corresponding points. An advantage of the constant direction of movement of exerting the force is the relatively simple device with few components and the relatively uniform load of the components with which this can be made possible.

The present method is preferably further characterized in that the carrier moves linearly at constant speed and the carrier member is arranged on a conveyor which moves above the carrier and the transporting speed of which is greater than that of the carrier.

A following preferred method is characterized in that carrier members located successively in lengthwise direction are arranged shifted in transverse direction relative to the direction of movement such that successive dough pieces are turned in opposite directions. The advantage of this method is that the angle through which the dough piece has to be turned is as small as possible with a linear movement of the carrier member.

The device which operates in accordance with the methods as described above is characterized by a movable endless carrier for dough pieces and an endless conveyor for carrier members running parallel to the carrier, the lower part of which conveyor faces towards the carrier and wherein the mutual distance of the parts is chosen such that the carrier members reach to practically the upper part of the carrier. The fact that the carrier and the conveyor are endless has the advantage here that the drive is continuous, this is constructionally simple with a loading of the components that remains largely uniform.

It is possible for the carrier members to take the form of a freely rotatable roller of which the axis is oriented perpendicularly of the upper part of the carrier.

A following preferred embodiment is one wherein the length of the lower part and the speed of movement of the conveyor are chosen such that the dough pieces undergo an angular displacement through about 90°, with the advantage that at a constant speed of the carrier members all dough pieces have to be turned for an equal length of time.

The device can also be characterized in that the conveyor is a chain conveyor and the carrier is a belt conveyor. This has the advantage that both are more or less standardized elements.

The longitudinal direction of the conveyor and that of the carrier can enclose an angle.

Additional advantage can be obtained when the device is integrated as a unit so that the unit can be placed simply in the production process or removed therefrom.

BRIEF DESCRIPTION OF THE DRAWINGS

The invention will be further elucidated with reference to the annexed drawings. Herein.

DESCRIPTION OF THE PREFERRED EMBODIMENTS

Figure 1:
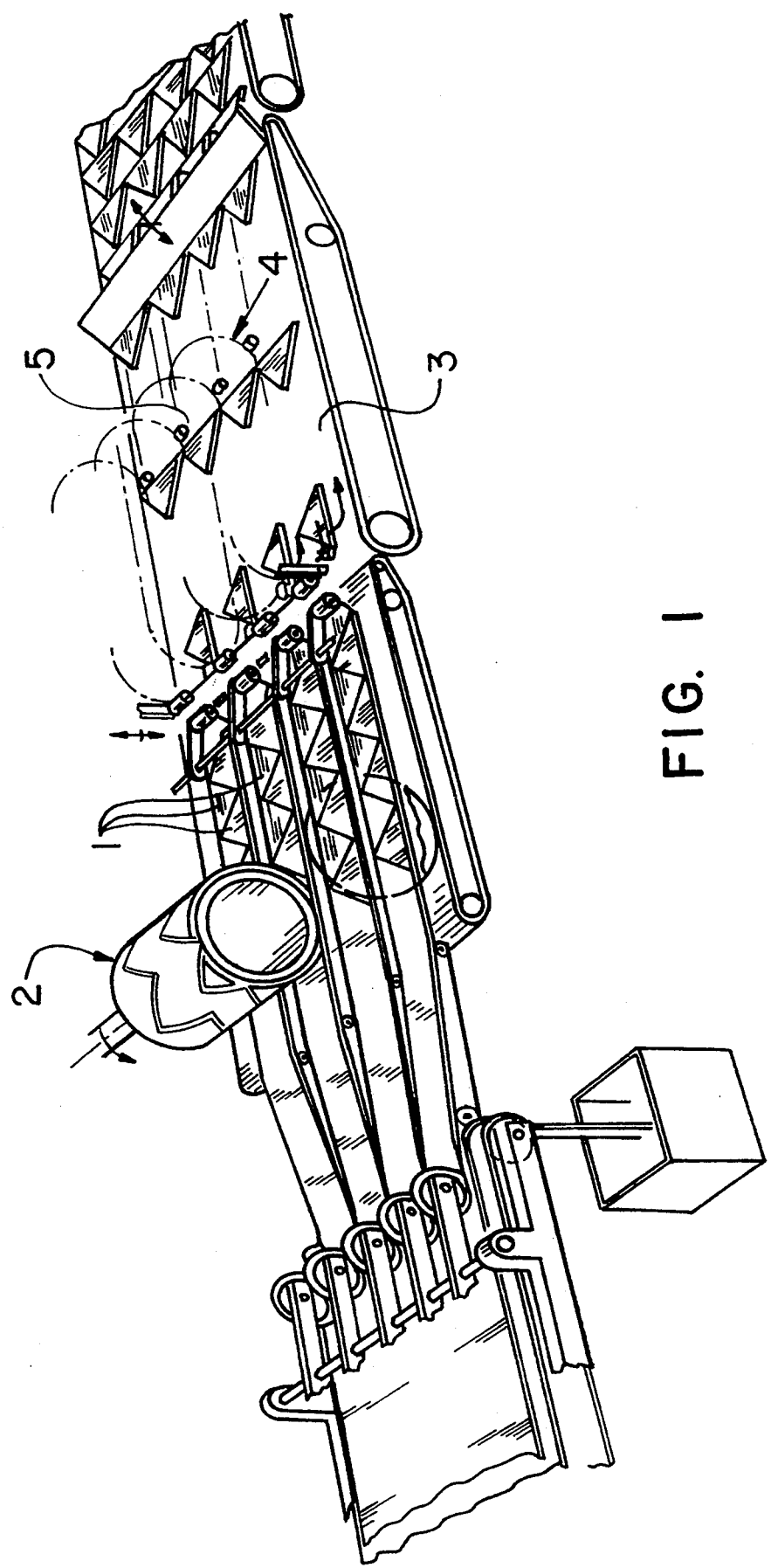
FIG. 1 shows a perspective view of the forming of dough pieces with four devices.

FIG. 1 shows a perspective view of the linked forming of dough pieces 1 by a cutting roller 2, placing of the dough pieces 1 linked in rows at a distance from each other, and four conveyors 4 arranged above the carrier 3 and provided with a carrier member 5 for positioning the dough pieces 1 in a row with corresponding sides parallel to each other.

Figure 2:
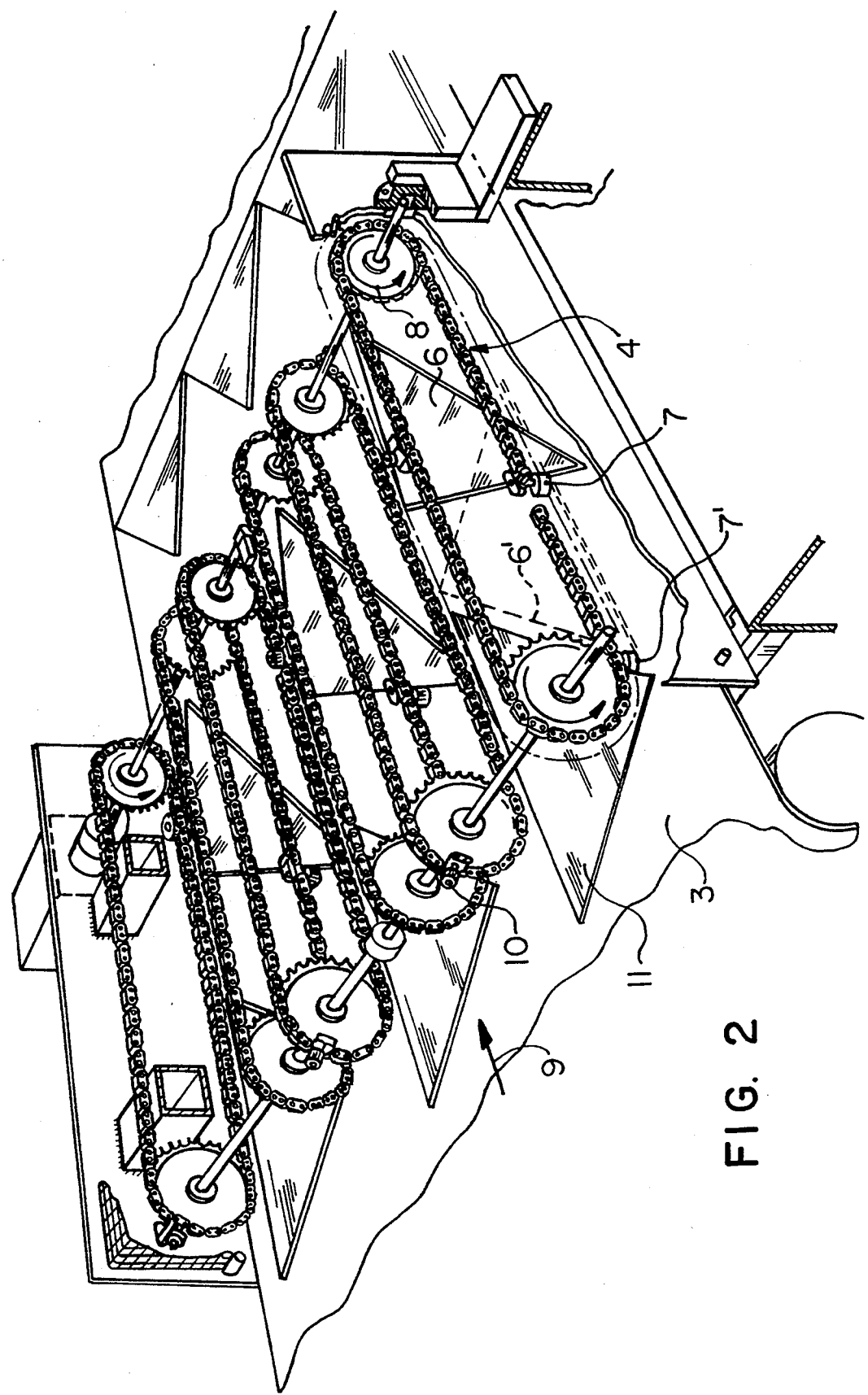
FIG. 2 shows a perspective view of the positioning of the dough pieces with three devices.

FIG. 2 is a perspective view of the positioning of the dough pieces 6, 11 with three of the devices. The dough piece 6 lying on carrier 3 is turned by the moving carrier member 7 because the transporting speed 8 of conveyor 4 is greater than the carrying speed 9 of carrier 3. The carrier member 10 following carrier member 7 in lengthwise direction is arranged shifted in transverse direction relative to the direction of movement such that the dough piece 11 following dough piece 6 is turned in a direction opposite to that in which dough piece 6 is turned.

Figure 3:
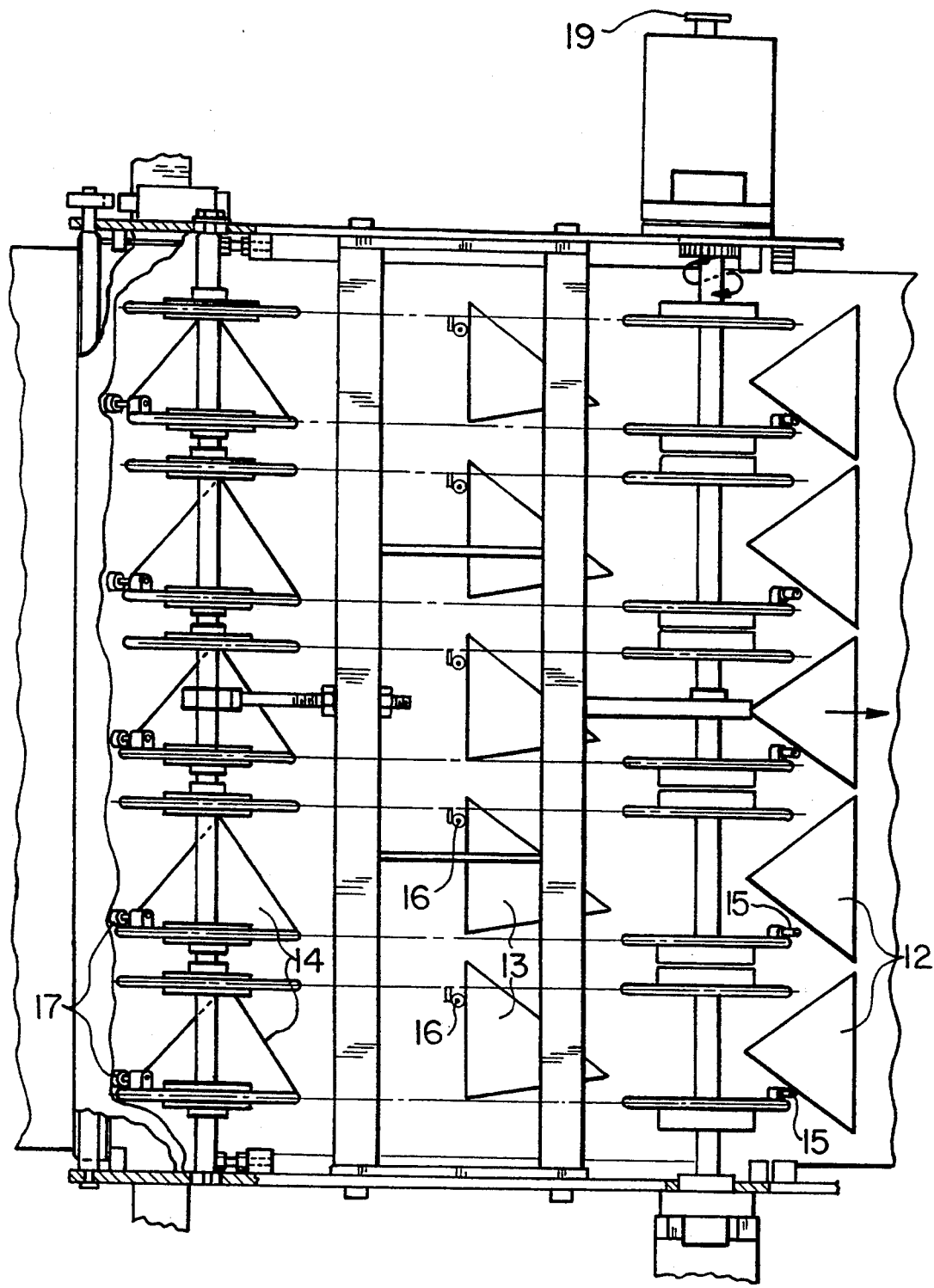
FIG. 3 is a top view of a five positioning devices.

FIG. 3 is a top view of a five devices wherein the dough pieces 12, 13, 14 lying in a row co-act with the carrier members 15, 16, 17 embodied as freely rotating rollers. The successive carrier members 15, 16, 17 are arranged shifted in transverse direction relative to the direction of movement such that the dough pieces 12, 14 are turned to the left and dough pieces 13 lying therebetween are turned to the right.

Figure 4:
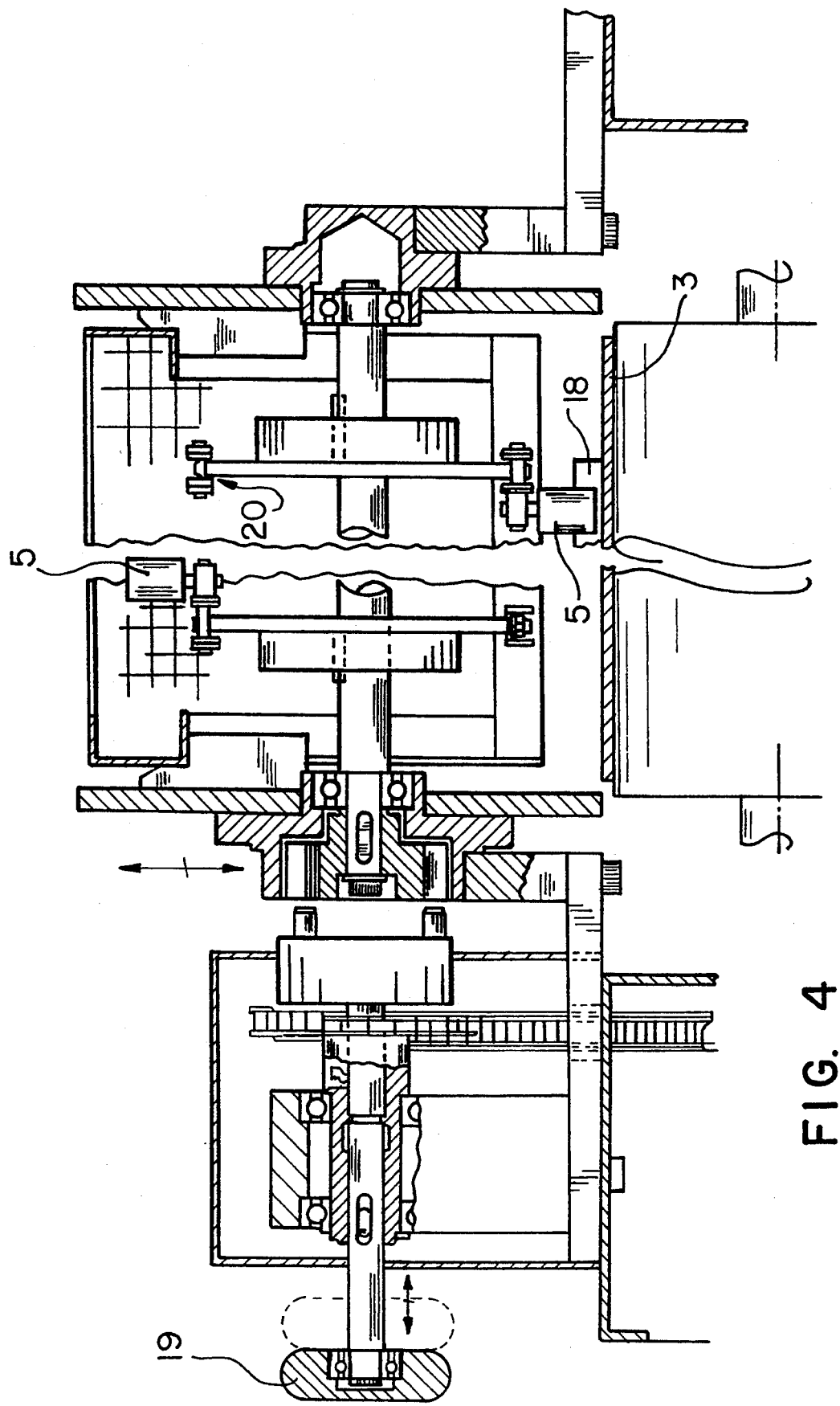
FIG. 4 is a side view of the transmission of the drive of the positioning device.

FIG. 4 shows a cross section at right angles to the movement of dough piece 18. It is possible to connect and disconnect the drive of the conveyor 20 by axially moving the knob 19. This construction method is applied so as to make the conveyor interchangeable with otherwise embodied conveyors so that differently shaped dough pieces can be positioned without labor-intensive change-overs being necessary.

Figure 5:
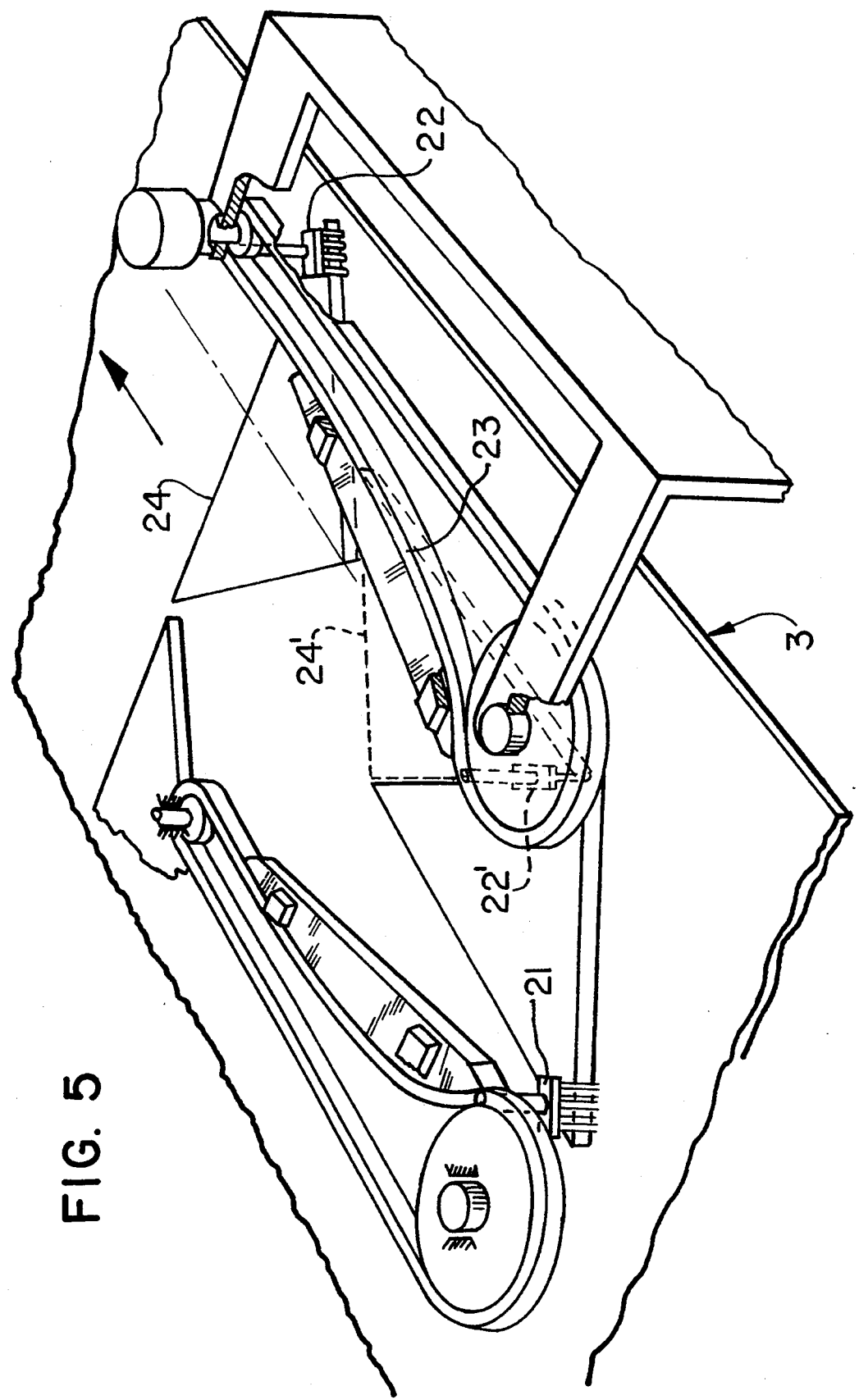
FIG. 5 is a perspective schematic view of an alternative embodiment of the positioning device.

FIG. 5 is a perspective view of an alternative embodiment of the device. The carrier members 21, 22 are fork-like and the path of the conveyor 23 and carrier member 22 is not linear during turning of the dough piece 24.

I claim:

1. A method for positioning similarly shaped dough pieces form-fittingly in a row on a carrier with corresponding sides mutually parallel, said method comprising the steps of:

placing similarly shaped dough pieces at spaced apart intervals on a carrier, each of said dough pieces having a periphery; and exerting a force on a point on the periphery of each of said dough pieces with a moving carrier member, with the operating line of said force lying outside the centre of gravity of each dough piece, whereby the dough pieces are turned such that corresponding sides of said dough pieces become mutually parallel.

2. The method as claimed in claim 1, wherein the direction of movement of said carrier member is always the same during exertion of said force and wherein said force is exerted on a point on the periphery of one dough piece which is different from a point of exertion of said force on the periphery of a successive dough piece.

3. The method as claimed in claim 1, wherein said carrier moves linearly at constant speed and wherein said carrier member is arranged on a conveyor which moves above said carrier at a speed greater than that of said carrier.

4. The method as claimed in claim 1, further including at least two carrier members, said carrier members are located successively in lengthwise direction and are shifted in a transverse direction relative to the direction of movement, with said carrier members turning successive dough pieces in opposite directions.

* * * * *